(12) United States Patent
Harada

(10) Patent No.: US 9,360,860 B2
(45) Date of Patent: Jun. 7, 2016

(54) ENTRY DETECTION DEVICE, ROBOT, AND ENTRY DETECTION METHOD

(71) Applicant: Seiko Epson Corporation, Tokyo (JP)

(72) Inventor: Atsushi Harada, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/681,720

(22) Filed: Apr. 8, 2015

(65) Prior Publication Data

US 2015/0212514 A1 Jul. 30, 2015

Related U.S. Application Data

(62) Division of application No. 13/736,507, filed on Jan. 8, 2013, now Pat. No. 9,031,694.

(30) Foreign Application Priority Data

Jan. 30, 2012 (JP) ................. 2012-016385

(51) Int. Cl.
*G05B 19/4061* (2006.01)
*G01J 1/02* (2006.01)
*G05B 19/048* (2006.01)
*G01V 8/20* (2006.01)

(52) U.S. Cl.
CPC .............. *G05B 19/4061* (2013.01); *G01J 1/02* (2013.01); *G01V 8/20* (2013.01); *G05B 19/048* (2013.01); *G05B 2219/35318* (2013.01); *G05B 2219/39449* (2013.01); *Y02P 90/265* (2015.11); *Y10S 901/09* (2013.01); *Y10S 901/47* (2013.01)

(58) Field of Classification Search
CPC ..... G05B 19/4061; G05B 19/048; G01J 1/02; G01J 1/10; G01V 8/20
See application file for complete search history.

(56) References Cited

U.S. PATENT DOCUMENTS

| 4,559,526 | A | | 12/1985 | Tani et al. | |
|---|---|---|---|---|---|
| 4,753,569 | A | | 6/1988 | Pryor | |
| 4,818,866 | A | | 4/1989 | Weber | |
| 5,526,119 | A | | 6/1996 | Blit et al. | |
| 6,023,064 | A | | 2/2000 | Burgin | |
| 6,166,371 | A | * | 12/2000 | Milbrath | G01V 8/20 250/221 |
| 7,675,416 | B2 | | 3/2010 | Sato | |
| 2014/0319358 | A1 | * | 10/2014 | Hardegger | G01V 8/20 250/349 |
| 2014/0361149 | A1 | * | 12/2014 | Meinherz | G01V 8/20 250/208.1 |

FOREIGN PATENT DOCUMENTS

| JP | 59-002198 | 1/1984 |
|---|---|---|
| JP | 63-500822 | 3/1988 |
| JP | 08-069578 A | 3/1996 |

(Continued)

*Primary Examiner* — Nicholas Kiswanto
(74) *Attorney, Agent, or Firm* — Harness, Dickey & Pierce, P.L.C.

(57) ABSTRACT

An entry detection device includes first light marks and second light marks. A control signal corresponding to a part of the first light marks is an error detection code of the control signal corresponding to the other part of the first light marks. A first inspection value is generated based on a first part of a light receiving signal corresponding to the other part of the first light marks. A second inspection value is generated based on a reverse bit string of a third part of the light receiving signal corresponding to a part of the second light mark paired with the other part of the first light marks. An entry is detected based on the first inspection value and the second inspection value.

1 Claim, 9 Drawing Sheets

(56) References Cited

FOREIGN PATENT DOCUMENTS

| | | |
|---|---|---|
| JP | 10-103923 | 4/1998 |
| JP | 10-510479 | 10/1998 |
| JP | 2001-071192 A | 3/2001 |
| JP | 2001-235367 A | 8/2001 |
| JP | 2004-279127 A | 10/2004 |
| JP | 2006-323709 A | 11/2006 |
| JP | 2007-104041 A | 4/2007 |
| JP | 2007-179401 A | 7/2007 |
| JP | 2007-283450 A | 11/2007 |
| JP | 2010-015258 A | 1/2010 |
| JP | 2010-133765 A | 6/2010 |
| JP | 2010-231713 A | 10/2010 |

* cited by examiner

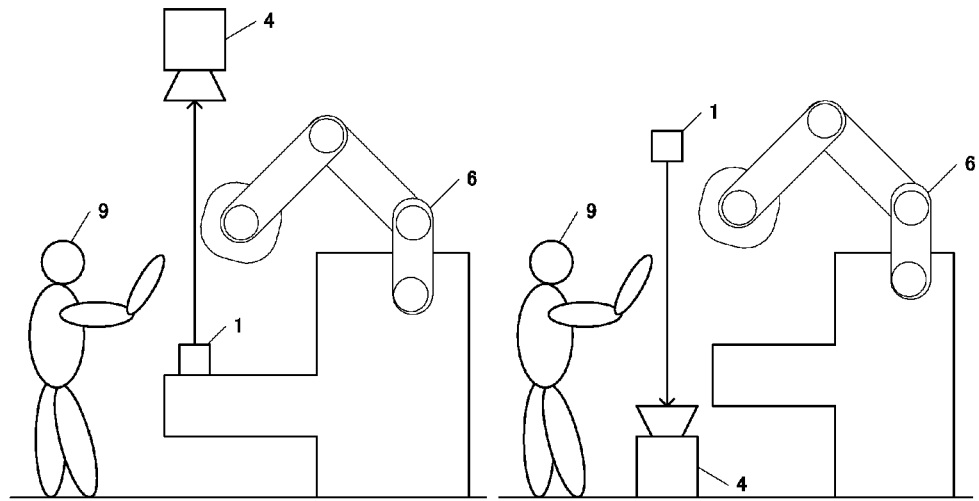
FIG. 10A  FIG. 10B
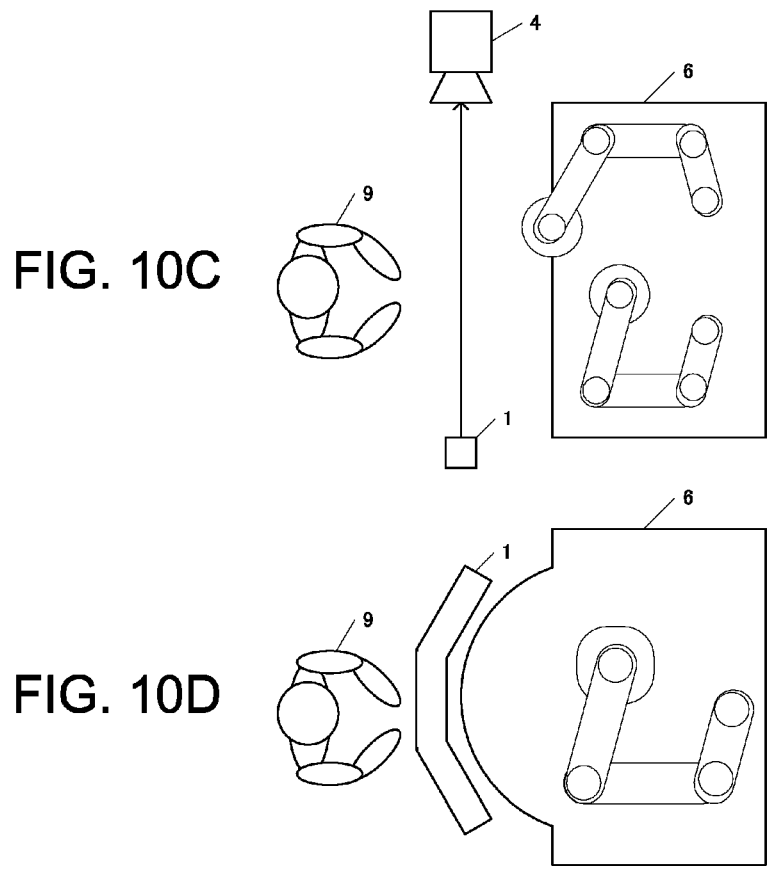
FIG. 10C
FIG. 10D

ENTRY DETECTION DEVICE, ROBOT, AND ENTRY DETECTION METHOD

CROSS-REFERENCE TO RELATED APPLICATIONS

This is a continuation patent application of U.S. application Ser. No. 13/736,507 filed Jan. 8, 2013 which claims priority to Japanese Patent Application No. 2012-016385, filed Jan. 30, 2012 both of which are expressly incorporated by reference herein in their entireties.

BACKGROUND

1. Technical Field

The present invention relates to an entry detection device, a robot, and an entry detection method.

2. Related Art

According to the related art, a technique of detecting an entry of a person into a danger zone or an entry of a suspicious person into private land using a camera is known. For example, JP-A-2010-231713 discloses a technique in which whether an optical path from a light source or a reflection mirror arranged along a predetermined boundary to a camera is intercepted or not is determined based on an output from the camera, thus detecting an entry of a person into a danger zone beyond the boundary. JP-A-2010-15258 discloses a technique in which each of light emission patterns of plural light sources is provided with certain information, thus specifying which of the optical paths from the light sources to the camera a trespasser is in. In these techniques, it is determined that there is an entry when a lighting pattern of a light source and a luminance pattern in a specified area detected by a light sensor do not coincide with each other.

However, with the related-art techniques, when a light source is off, an entry across the optical path from that light source to the camera cannot be detected. Meanwhile, if the light source is constantly on, a person can easily make an entry by installing a dummy light source in the optical path. Therefore, it is not desirable to keep the light source on constantly.

Also, in the related-art techniques, since a time-series light emission pattern in which the light source is turned on and off and a time-series luminance pattern in a specific area detected by the light sensor are compared to detect an entry, the entry cannot be detected based on each frame of a digital image outputted from the camera. Therefore, there is a problem that there is a delay between the occurrence of the entry and the detection of the entry.

SUMMARY

An advantage of some aspects of the invention is that an entry into a specific area can be detected securely with a minimum delay.

(1) An aspect of the invention is directed to an entry detection device including: plural first light marks arrayed in an area on one side demarcated by a boundary and along the boundary; plural second light marks arrayed in one-to-one pairs with the plural first light marks, in an area on the other side demarcated by the boundary; a light on-off control unit which generates a control signal that varies the first light marks which are made to emit light and the second light marks which are made to emit light depending on time, wherein when one of the pair is made to emit light, the other is not made to emit light, and a part of the control signal corresponding to a part of the plural first light marks at an arbitrary time is an error detection code of the other part of the control signal corresponding to the other part of the plural first light marks; a light sensor which receives light from the plural first light marks and the plural second light marks and outputs a signal corresponding to the light; and a detection unit which generates a light receiving signal by binarizing the signal outputted from the light sensor for each of the light marks, generates a first inspection value of the error detection code based on a first part of the light receiving signal corresponding to the other part of the plural first light marks, generates a second inspection value of the error detection code based on a reverse bit string of a third part of the light receiving signal corresponding to the second light mark paired with the other part of the plural first light marks, and detects an entry to the boundary based on a result of comparison between a second part of the light receiving signal corresponding to the one part of the plural first light marks and the first inspection value and a result of comparison between a reverse bit string of a fourth part of the light receiving signal corresponding to the second light mark paired with the one part of the plural first light marks and the second inspection value.

According to this aspect of the invention, the individual light marks emit light or do not emit light depending on time. Therefore, it is difficult to make an entry by deceiving the entry detection device with a shielding object or the like having a dummy light source. Even when one of the pair of light marks arranged on both sides of the boundary does not emit light, the other emits light. Therefore, when there is an entry across the boundary, the optical path from one of the pair of light marks to the light sensor is necessarily intercepted. Thus, according to this aspect of the invention, an entry across the boundary can securely be detected. In this specification, the light mark is a component which radiates or reflects light and can control the amount of radiated or reflected light by turning on or off the light source, by intercepting or opening the optical path, or by changing the reflectance of a reflection plate or the like. Also, according to this aspect of the invention, simply based on that the inspection value of the error detection code generated from the first part of the light receiving signal corresponding to the one part of the first light marks at a certain time and the second part of the light receiving signal corresponding to the other part of the first light marks do not coincide with each other, an entry may be considered to be happening in the optical path from the first light mark to the light sensor at that time. Conversely, simply based on that the inspection value of the error detection code generated from the first part of the light receiving signal corresponding to the one part of the first light marks at a certain time and the second part of the light receiving signal corresponding to the other part of the first light marks coincide with each other, an entry may be considered not to be happening in the optical path from the first light mark to the light sensor at that time. That is, an entry in the optical path from the first light mark to the light sensor can be detected, based on the part of the light receiving signal corresponding to the first light mark. Similarly, an entry in the optical path from the second light mark to the light sensor can be detected, based on the part of the light receiving signal corresponding to the second light mark. However, the light emission patterns of the first light mark and the second light mark are the reverse of each other in terms of on and off. Therefore, by comparing the second inspection value generated from the reverse bit string of the third part of the light receiving signal with the reverse bit string of the fourth part of the light receiving signal, an entry in the optical path from the second light mark to the light sensor can be detected. That is, according to this aspect of the invention, at each time, an entry at that time can be detected. Therefore, an entry into a specific area can securely be detected without any delay and whether the entry is from the side of the first light mark side or from the side of the second light mark can be specified as well.

(2) The entry detection device may be configured to include plural light mark blocks including the plural first light marks and the plural second light marks and arrayed along the boundary.

By employing this configuration, since an entry is detected in each light mark block, the position of entry can be specified or the optical path from a specific light mark block to the light sensor can be made a temporarily undetectable zone.

(3) The entry detection device may be configured such that the control signal includes information to be transmitted to the detection unit and the detection unit acquires the information based on the output from the light sensor.

When this configuration is employed, information can be transmitted through light emitted by the light mark to the detection unit detecting an entry based on the output from the light sensor. For example, when identification information that can specify the individual light marks is transmitted as a time-series light emission pattern, an area where an image of a specific light mark is recorded in image data can be specified based on the output from the light sensor, even if the correspondence between the light marks and the light sensor is not fixed. Also, for example, when time information is transmitted as a spatial light emission pattern, the time of entry can be specified even if no clock is provided on the entry detecting side.

(4) Another aspect of the invention is directed to a robot including: plural first light marks arrayed in an area on one side demarcated by a boundary and along the boundary; plural second light marks arrayed in one-to-one pairs with the plural first light marks, in an area on the other side demarcated by the boundary; a light on-off control unit which generates a control signal that varies the first light marks which are made to emit light and the second light marks which are made to emit light depending on time, wherein when one of the pair is made to emit light, the other is not made to emit light, and a part of the control signal corresponding to apart of the plural first light marks at an arbitrary time is an error detection code of the other part of the control signal corresponding to the other part of the plural first light marks; a light sensor which receives light from the plural first light marks and the plural second light marks and outputs a signal corresponding to the light; a detection unit which generates a light receiving signal by binarizing the signal outputted from the light sensor for each of the light marks, generates a first inspection value of the error detection code based on a first part of the light receiving signal corresponding to the other part of the plural first light marks, generates a second inspection value of the error detection code based on a reverse bit string of a third part of the light receiving signal corresponding to the second light mark paired with the other part of the plural first light marks, and detects an entry to the boundary based on a result of comparison between a second part of the light receiving signal corresponding to the one part of the plural first light marks and the first inspection value and a result of comparison between a reverse bit string of a fourth part of the light receiving signal corresponding to the second light mark paired with the one part of the plural first light marks and the second inspection value; and a startup control unit which starts predetermined processing when the entry is detected.

According to this aspect of the invention, an emergency stop can be implemented so that no harm will be done to a person working in cooperation with the robot, and processing can be started as a workpiece is placed.

The order in which operations described in the accompanying claims are carried out is not limited to the described order unless there is any technical impediment. The operations may be executed simultaneously or executed in the reverse order of the described order. The operations may not be executed in a continuous order. Moreover, an aspect of the invention is also implemented as an entry detection method.

BRIEF DESCRIPTION OF THE DRAWINGS

The invention will be described with reference to the accompanying drawings, wherein like numbers reference like elements.

FIGS. 10A to 10D are schematic views according to an embodiment of the invention.

DESCRIPTION OF EXEMPLARY EMBODIMENTS

Figure 1:
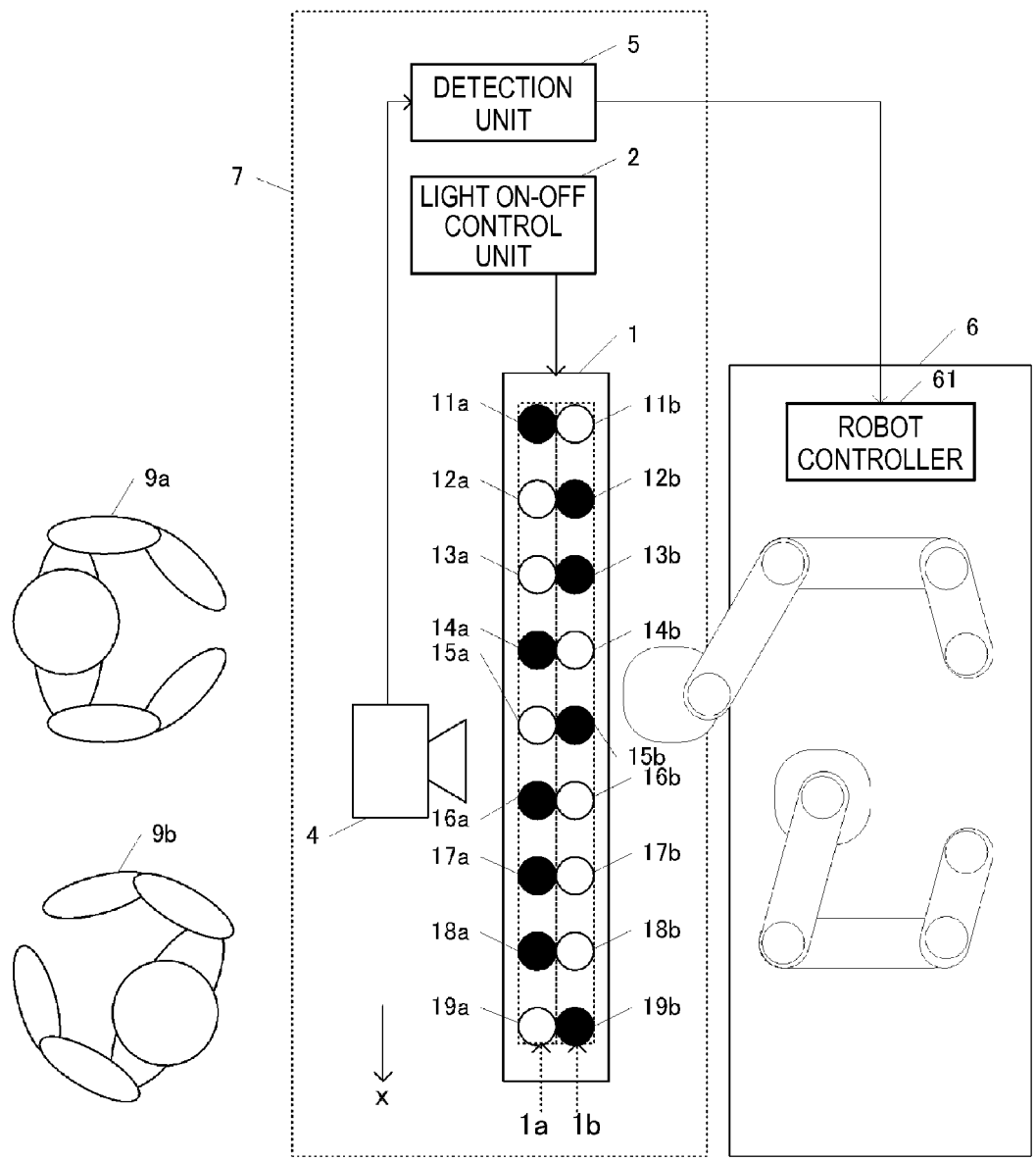
FIG. 1 is a block diagram according to an embodiment of the invention.

Hereinafter, embodiments of the invention will be described based on examples with reference to the accompanying drawings. Equivalent components in the drawings are denoted by the same reference numerals and duplicate explanation of such components in each example is omitted.

1. First Example

FIG. 1 shows the overall configuration of a first example of the invention. The first example of the invention is an industrial robot having a robot body 6 and an entry detection device 7 for detecting an entry made by workers 9a, 9b toward the robot body 6 beyond a boundary that demarcates a predetermined safe work zone and a danger zone.

The robot body 6 has a robot controller 61 as a startup control unit, and an actuator, sensor, multi-joint arm and the like, not shown, controlled by the robot controller 61. The robot body 6 is configured to operate in cooperation with the workers 9a, 9b. The control systems of the robot body 6 and the entry detection device 7 are independent of each other. The robot controller 61 of the robot body 6 and a detection unit 5 of the entry detection device 7 are connected to each other via a communication line. The robot controller 61 starts predetermined processing such as stopping an actuator, outputting an alarm sound or turning on a warning lamp, when the entry detection device 7 detects an entry. The functions of the robot controller 61 are realized by a computer which controls the entire robot body 6 and a computer program executed by the computer.

The entry detection device 7 has a light emitting unit 1 including plural LEDs (light emitting diodes) as light marks, a light on-off control unit 2 which controls light emission of the LEDs, a digital camera 4 installed in such a way that the light emitting unit 1 fits within the field of view, and the detection unit 5 which detects an entry based on an output from the digital camera 4. The light on-off control unit 2 and the detection unit 5 are formed by separate computers. The light on-off control unit 2 and the light emitting unit 1 are regarded as an integrated unit. The digital camera 4 and the detection unit 5 are regarded as another integrated unit. These two units are installed at both ends of a boundary over which an entry is detected.

The light emitting unit 1 is installed along the boundary between the safe work zone and the danger zone for the workers 9a, 9b. The light emitting unit 1 has a first light mark array 1a including LEDs 11a to 19a arrayed along and near the boundary in the safe work zone demarcated by the boundary, a second light mark array 1b including LEDs 11b to 19b arrayed in one-to-one pairs with the first light mark array, along the boundary in the danger zone demarcated by the boundary, and a drive circuit, not shown, for driving these LEDs 11a, 12a, 13a, 14a, 15a, 16a, 17a, 18a, 19a, 11b, 12b, 13b, 14b, 15b, 16b, 17b, 18b, 19b. A control signal generated by the light on-off control unit 2 is applied to the drive circuit. One LED belonging to the first light mark array 1a, and one LED that is opposite that LED across the boundary and belongs to the second light mark array 1b, are paired as a control target of the light on-off control unit 2. For example, the LED 11a and the LED 11b are paired and the LED 12a and the LED 12b are paired. Thus, the pair of the LED 11a and the LED 11b is referred to as a pair 11, and the pair of the LED 12a and the LED 12b is referred to as a pair 12. An arbitrary pair is arranged near each other on both sides of the boundary. The line connecting the center of each LED of the pair arranged on both sides of the boundary is orthogonal to the boundary.

The digital camera 4 has an area image sensor, not shown, as a light sensor. The area image sensor is formed by a CCD image sensor, CMOS image sensor or the like, and can pick up an image of all the LEDs 11a, 12a, 13a, 14a, 15a, 16a, 17a, 18a, 19a, 11b, 12b, 13b, 14b, 15b, 16b, 17b, 18b, 19b formed by a lens, not shown. The pickup timing of each frame in the digital camera 4 is controlled in such a manner that the light emission pattern of the LEDs 11 to 19 does not change during a period when an electric charge is accumulated in a photoelectric conversion element of the image sensor so that the digital camera 4 can generate image data of each frame.

Figure 2:
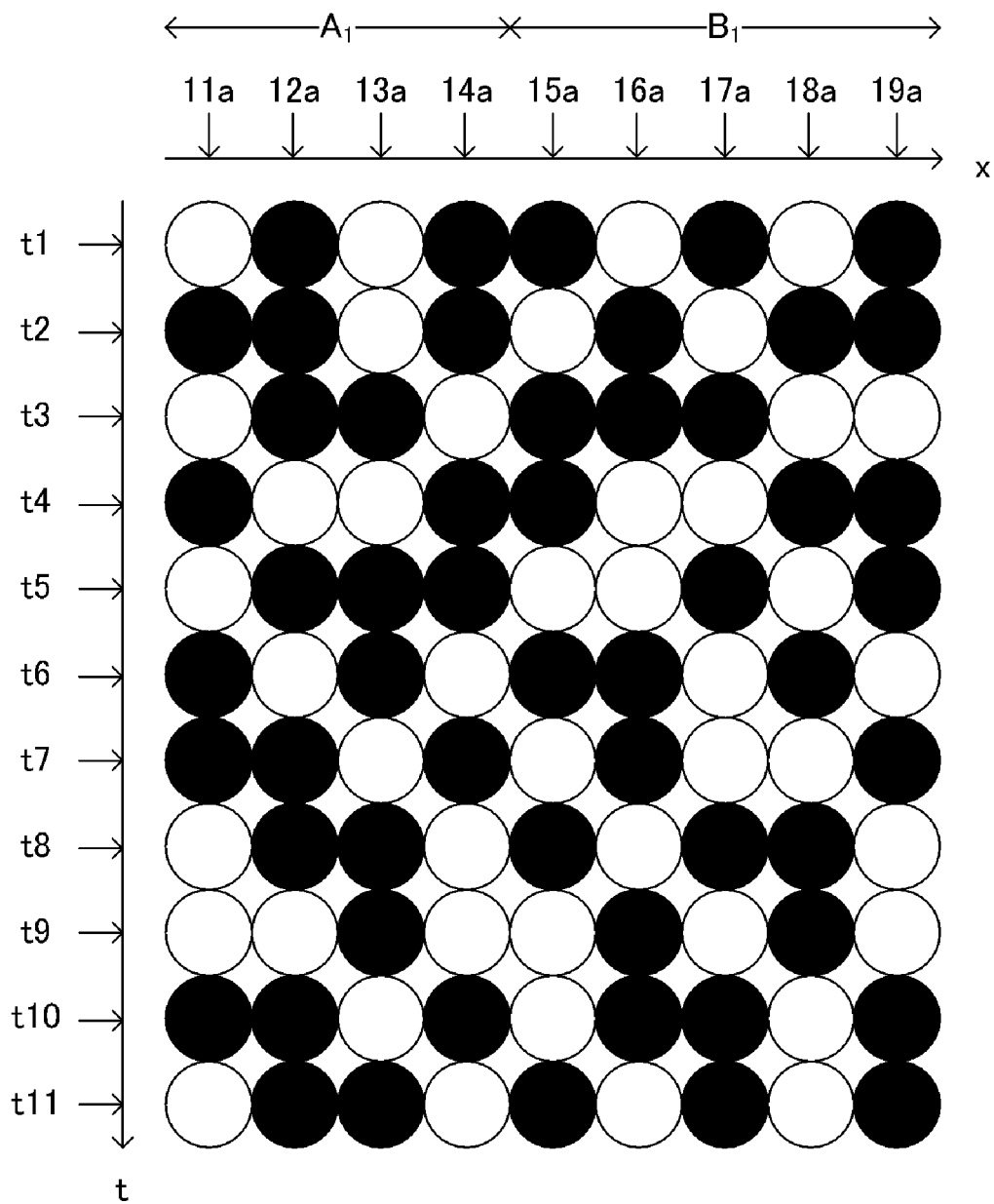
FIG. 2 is a schematic view according to an embodiment of the invention.

FIG. 2 is a schematic view showing an example of the light emission pattern of the LEDs 11a, 12a, 13a, 14a, 15a, 16a, 17a, 18a, 19a controlled by the light on-off control unit 2. In FIG. 2, t represents time axis. An x axis defined parallel to the boundary between the safe work zone and the danger zone as shown in FIG. 1 is also shown in FIG. 2. In FIG. 2, a white circle indicates that the LED is on, and a black circle indicates that the LED is off. When the drive circuit of the light on-off control unit 2 and the light emitting unit 1 turns on one LED of each pair 11 to 19, the drive circuit turns off the other LED. Even when one LED of the pair does not emit light, the other LED emits light. Therefore, if there is an entry, the optical path from one LED of the pair to the digital camera 4 is necessarily intercepted. Thus, an entry into the danger zone beyond the boundary can securely be detected. Although FIG. 2 only shows the light emission pattern of the first light mark array 1a, the light emission pattern of the second light mark array 1b is the reverse of the light emission pattern shown in FIG. 2 and therefore the illustration thereof is omitted.

First, a light emission pattern of the LEDs at an arbitrary time will be described. For example, at a time t1, the LEDs 11a, 13a, 16a, 18a are on and the LEDs 12a, 14a, 15a, 17a, 19a are off. In this manner, it is preferable that the first light mark array 1a arranged in the x axis direction along the boundary between the safe work zone and the danger zone includes the LEDs 11a, 13a, 16a, 18a which emit light and the LEDs 12a, 14a, 15a, 17a, 19a which do not emit light in arbitrary timing. The light emission pattern of the first light mark array 1a and the light emission pattern of the second light mark array 1b are the reverse of each other in each pair of LEDs. Therefore, as a matter of course, if the first light mark array 1a includes both LEDs emitting light and LEDs not emitting light, the second light mark array 1b includes both LEDs emitting light and LEDs not emitting light. If the LED group arranged in the x axis direction along the boundary between the safe work zone and the danger zone includes LEDs emitting light and LEDs not emitting light in this manner, an undetectable zone at an arbitrary time can be diminished. For example, if a foreign matter enters only the optical paths from the LEDs 12a, 14a, 15a, 17a, 19a to the digital camera 4 at the time t1, the entry of the foreign matter cannot be detected because these LEDs are off. However, since the LEDs 11a, 13a, 16a, 18a, belonging to the same group a and arranged next to these off-state LEDs, are on, the foreign matter is highly likely to be detected. Moreover, since the LEDs 12b, 14b, 15b, 17b, 19b paired with the LEDs 12a, 14a, 15a, 17a, 19a which are off at the time t1 are on, the foreign matter is highly likely to be detected. Of course, when all the LEDs of the first group a arranged in the x axis direction along the boundary between the safe work zone and the danger zone are on, there is no undetectable zone in the optical path from the first group a to the digital camera 4. However, when all the LEDs of the first group a are on, the entire optical path from the second group b to the digital camera 4 is an undetectable zone. Therefore, the undetectable zone can be narrowed down further by including both LEDs emitting light and LEDs not emitting light in the LEDs groups arranged in the x axis direction.

Next, a time-series light emission pattern of an arbitrary LED will be described. For example, the LED 11a is on at times t1, t3, t5, t8, t9, t11 and off at times t2, t4, t6, t7, t10. By thus turning an arbitrary LED on and off depending on time, the undetectable zone on the time axis can be shortened. For example, if a foreign matter enters only the optical path from the LED 11a to the digital camera 4 at the time t2, the foreign matter cannot be detected because the LED 11a is off. However, since the LED 11a is on at the times t1 and t3, that is, immediately before and after the time t2, the foreign matter is highly likely to be detected. Of course, if the LED 11a is constantly on, there is no undetectable zone in the optical path from the LED 11a to the digital camera 4. However, if the LED 11a is constantly on, the optical path from the LED 11b paired with the LED 11a to the digital camera 4 is a constantly undetectable zone. Therefore, the temporal undetectable zone can be shortened by turning an arbitrary LED on and off depending on time.

By thus including LEDs emitting light and LEDs not emitting light in the LED groups arranged in the x axis direction along the boundary between the safe work zone and the danger zone and turning an arbitrary LED on and off depending on time, the undetectable zone can be narrowed down and shortened. Moreover, by thus changing the light emission pattern of the LEDs in terms of time and space, a deliberate entry can be prevented. For example, if the light emission pattern of the LEDs does not change in terms of time, a person can place a shielding object imitating the spatial light emission pattern between the light emitting unit 1 and the digital camera 4 and thus enter the danger zone from between the shielding object and the light emitting unit 1 without being detected by the entry detection device 7. Meanwhile, for example, if the light emission pattern of the LEDs does not change in terms of space, a person can place a shielding object imitating the temporal light emission pattern between the light emitting unit 1 and the digital camera 4 and thus enter the danger zone from between the shielding object and the light emitting unit 1 without being detected by the entry detection device 7. However, if the light emission pattern of the LEDs changes in terms of both time and space, it is extremely difficult to imitate the light emission pattern of the LEDs and a deliberate entry is substantially impossible.

The control signal of the LEDs 11a, 12a, 13a, 14a, 15a, 16a, 17a, 18a, 19a, 11b, 12b, 13b, 14b, 15b, 16b, 17b, 18b, 19b generated by the light on-off control unit 2 is binary data having two states of on and off with respect to each LED. Thus, if the on-state is expressed by 1, the off-state is expressed by 0 and upper one bit is allocated to each of the LEDs 11a, 12a, 13a, 14a, 15a, 16a, 17a, 18a, 19a in order from the left to express a part of the control signal corresponding to the first light mark array 1a as a binary number, this part is "101001010" at the time t1 and "001010100" at the time t2. As described above, when one LED of each pair of LEDs 11 to 19 is on, the other LED is off. To control each pair of LEDs 11 to 19 in this manner, the light on-off control unit 2 generates a bit string which is the reverse of the bit string of the part of the control signal corresponding to the first light mark array 1a, as the bit string of the part of the control signal corresponding to the second light mark array 1b. For example, at the time t1, "110101011" is generated as the bit string of the part of the control signal corresponding to the LEDs 11b, 12b, 13b, 14b, 15b, 16b, 17b, 18b, 19b. Also, the light on-off control unit 2 may generate a bit string corresponding to one of the first light mark array 1a and the second light mark array 1b as a control signal, and the drive circuit of the light emitting unit 1 may generate a control signal of the other one of the first light mark array 1a and the second light mark array 1b by reversing the bit string of the control signal generated by the light on-off control unit 2.

Figure 3:
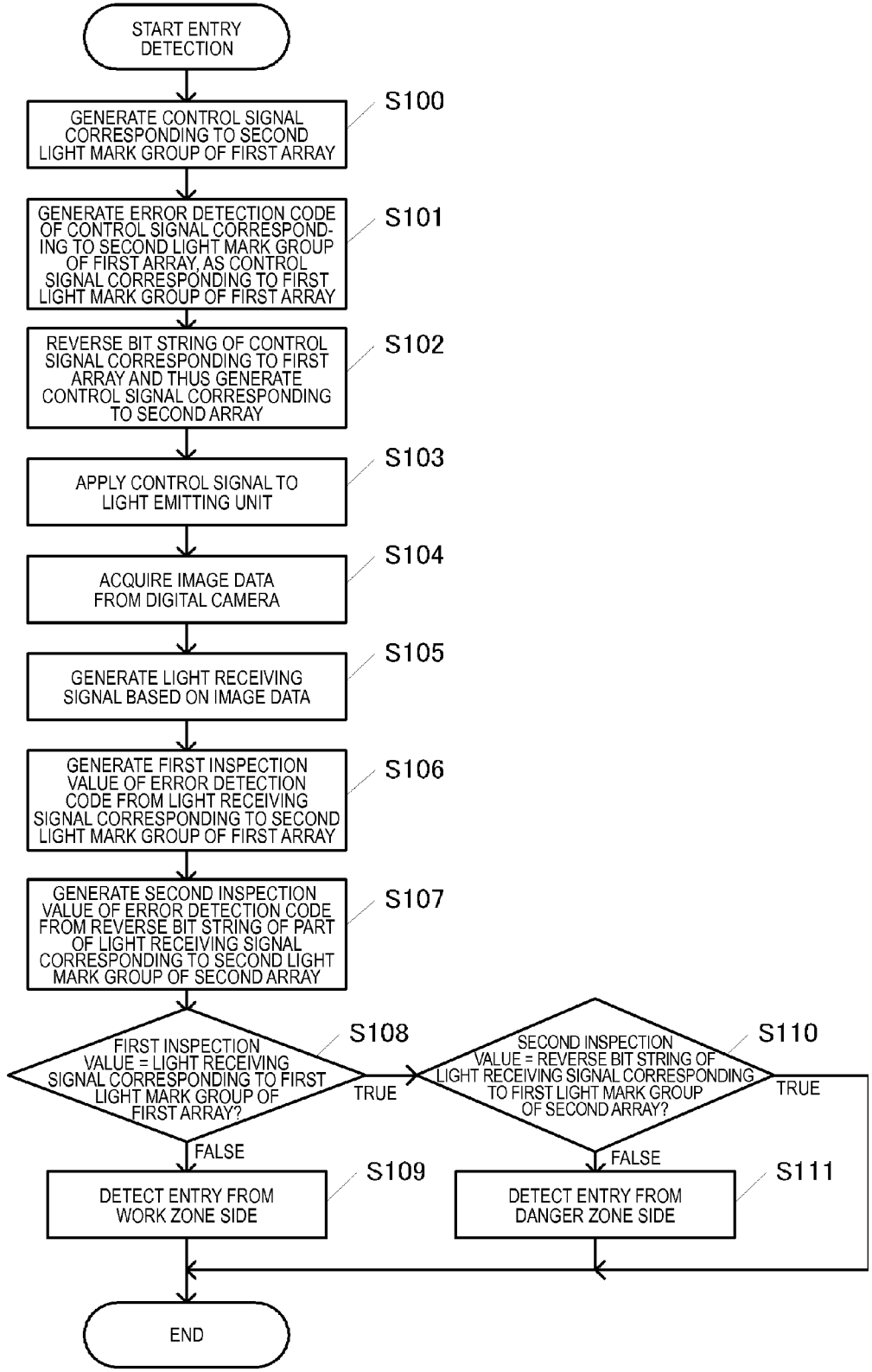
FIG. 3 is a flowchart according to an embodiment of the invention.

FIG. 3 is a flowchart showing procedures of an entry detection method using the entry detection device 7. FIG. 3 shows a series of processing procedures corresponding to one frame of image data outputted from the digital camera 4. That is, the processing shown in FIG. 3 is carried out for each frame of image data. In the following description, the LEDs 11a to 14a are referred to as a first light mark group A1 of the first light mark array 1a. The LEDs 15a to 19a are referred to as a second light mark group B1 of the first light mark array 1a. The LEDs 11b to 14b are referred to as a first light mark group A2 of the second light mark array 1b. The LEDs 15b to 19b are referred to as a second light mark group B2 of the second light mark array 1b. The number of LEDs belonging to the first light mark groups A1, A2 and the number of LEDs belonging to the second light mark group B1, B2 in this example are only simplified examples. For example, as described later, the number of the first light mark groups A1 corresponding to an error detection code may be one or more and may be decided according to the number of second light mark groups B1 suitably set according to the length of a boundary over which an entry is detected, and the type of the error detection code.

First, the light on-off control unit 2 generates a bit string of the control signal corresponding to the second light mark group B1 of the first array at a certain time (S100). That is, the light on-off control unit 2 generates a bit string of the part corresponding to the LEDs 15a to 19a forming the second light mark group B1 of the first array, of the control signal controlling the lighting of each of the individual LEDS forming the light mark array for each bit. For example, to realize the light emission pattern at the time t1 shown in FIG. 2, the light on-off control unit 2 generates a bit string "01010" as the part of the control signal corresponding to the LEDs 15 to 19.

Next, the light on-off control unit 2 generates an error detection code of the bit string of the part of the control signal corresponding the second light mark group B1 of the first array at a certain time, as a bit string of a part of the control signal corresponding to the first light mark group A1 of the first array at that time (S101). That is, the light on-off control unit 2 generates an error detection code of the bit string of the part of the control signal corresponding to the LEDs 15a to 19a as a bit string of the part corresponding to the LEDs 11a to 14a forming the first light mark group A1 of the first array, of the control signal controlling the on-state of each of the individual LEDs forming the light mark array for each bit. For example, to realize the light emission pattern at the time t1 shown in FIG. 2, the light on-off control unit 2 generates a bit string "1010" of the part of the control signal corresponding to the LEDs 11a to 14a, based on the bit string "01010" of the part of the control signal corresponding to the LEDs 15a to 19a.

The part of the control signal corresponding to the first light mark group A1 of the first array may be a bit string forming a code which can detect a transmission error of the part of the control signal corresponding to the second light mark group B1 of the first array, such as cyclic redundancy check code (CRC), parity code or check sum. Considering detection accuracy and high speed, the cyclic redundancy check code is preferable. Also, while it suffices to be able to detect a transmission error of the part of the control signal corresponding to the second light mark group B1 of the first array, the part of the control signal corresponding to the first light mark group A1 of the first array may be generated in such a way as to form a code that can correct a transmission error of the part of the control signal corresponding to the second light mark group B1 of the first array. That is, in this specification, the error detection code is used as a term including an error correction code.

Next, the light on-off control unit 2 generates a bit string of the part of the control signal corresponding to the second light mark array 1b by reversing the bit string of the part of the control signal corresponding to the first light mark array 1a (S102). For example, when the bit string "101001010" of the part of the control signal corresponding to the first light mark array 1a is generated in order to realize the light emission pattern at the time t1 shown in FIG. 2, the light on-off control unit 2 generates a bit string "010110101" of the part of the control signal corresponding to the second light mark array 1b.

Figure 4:
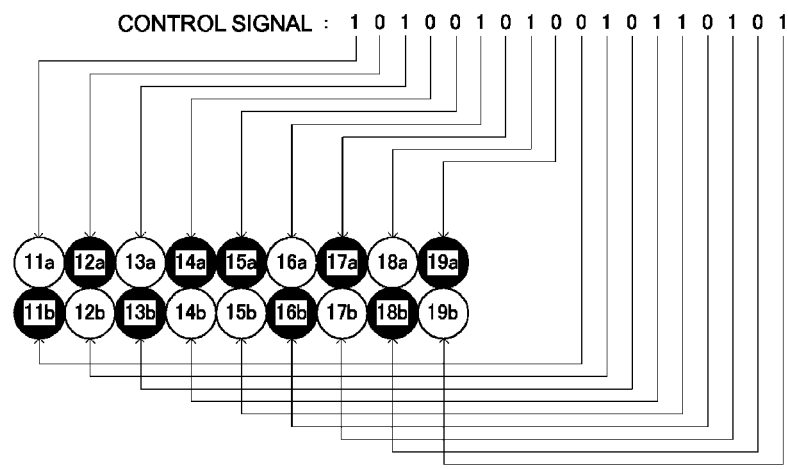
FIG. 4 is a schematic view according to an embodiment of the invention.

Next, the light on-off control unit 2 applies the control signal of the LEDs 11a, 12a, 13a, 14a, 15a, 16a, 17a, 18a, 19a, 11b, 12b, 13b, 14b, 15b, 16b, 17b, 18b, 19b to the light emitting unit 1 in predetermined timing (S103). For example, when 01010 is generated as the control signal corresponding to the second light mark group B1 at the time t1 in step S100 and 1010 is generated as the control signal corresponding to the first light mark group A1 at the time t1 in step S101, a control signal "101001010010110101" is applied to the light emitting unit 1, and the LEDs 11a, 13a, 16a, 18a, 12b, 14b, 15b, 17b, 19b are turned on while the LEDs 12a, 14a, 15a, 17a, 19a, 11b, 13b, 16b, 18b are turned off, as shown in FIG. 4. FIG. 4 shows the correspondence between each bit of the control signal and the LEDs 11a, 12a, 13a, 14a, 15a, 16a, 17a, 18a, 19a, 11b, 12b, 13b, 14b, 15b, 16b, 17b, 18b, 19b, in the drive circuit of the light emitting unit 1. In FIG. 4, a white circle indicates that the LED is on and a black circle indicates that the LED is off.

Next, the detection unit 5 acquires image data equivalent of one frame from the digital camera 4 (S104). As described above, in the timing when the digital camera 4 picks up the one-frame image of the light emitting unit 1, the light emitting state of the LEDs 11a, 12a, 13a, 14a, 15a, 16a, 17a, 18a, 19a, 11b, 12b, 13b, 14b, 15b, 16b, 17b, 18b, 19b of the light emitting unit 1 is controlled not to switch.

Next, the detection unit 5 analyzes the one-frame image data acquired from the digital camera 4 and generates a light receiving signal which indicates the light receiving state of the digital camera 4 to the light emitted from the LEDs 11a, 12a, 13a, 14a, 15a, 16a, 17a, 18a, 19a, 11b, 12b, 13b, 14b, 15b, 16b, 17b, 18b, 19b, as a binary number for each LED (S105).

Figure 5:
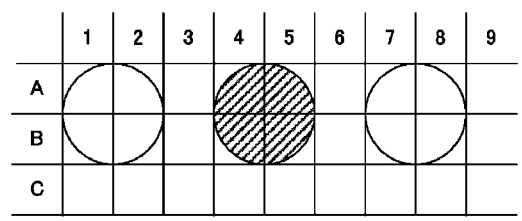
FIG. 5 is a schematic view according to an embodiment of the invention.

FIG. 5 is a schematic view showing the light receiving state of the digital camera 4 to the light emitted from the LEDs 11a, 12a, 13a, 14a, 15a, 16a, 17a, 18a, 19a, 11b, 12b, 13b, 14b, 15b, 16b, 17b, 18b, 19b, and shows an image expressed by a local area of the image data outputted from the digital camera 4. In FIG. 5, a white circle shows an image of an LED that is on, and a dark circle (hatched circle) shows an image of an LED that is off. Also, in FIG. 5, numbers and alphabetical letters are symbols indicating the position of pixels.

When the positional relation between the digital camera 4 and the light emitting unit 1 is fixed, images of the LEDs 11a, 12a, 13a, 14a, 15a, 16a, 17a, 18a, 19a, 11b, 12b, 13b, 14b, 15b, 16b, 17b, 18b, 19b are recorded in predetermined areas of the image data. Therefore, the detection unit 5 can compare the luminance value in each area corresponding to the images of the LEDs 11a, 12a, 13a, 14a, 15a, 16a, 17a, 18a, 19a, 11b, 12b, 13b, 14b, 15b, 16b, 17b, 18b, 19b with a threshold value and thus determine whether the corresponding LED is on or off. Specifically, for example, a case where the on-state LED 11a corresponds to pixels 1A, 1B, 2A, 2B and the off-state LED 12a corresponds to pixels 4A, 4B, 5A, 5B, is considered. In this case, the total of the luminance values of the pixels 1A, 1B, 2A, 2B is greater than the total of the luminance values of the pixels 4A, 4B, 5A, 5B. Therefore, if the total of the luminance values of the pixels 1A, 1B, 2A, 2B is greater than a predetermined threshold value, the detection unit 5 determines that the LED 11a is on. In the opposite case, the detection unit 5 determines that the LED 11a is off. More pixels may correspond to one LED or fewer pixels may correspond to one LED. Then, as each bit of the light receiving signal indicating the lighting state of each LED, the detection unit 5 generates 1 for the LED which is determined as on and 0 for the LED which is determined as off. For example, in the case of the light receiving state shown in FIG. 4, "101" is generated as the bit string of the corresponding part of the light receiving signal.

Next, the detection unit 5 generates a first inspection value of the error detection code based on the bit string of the part corresponding to the second light mark group B1 of the first array, of the generated light receiving signal (S106). Here, the function for generating the first inspection value of the error detection code may be any function that is the same as a function used when generating the bit string of the part of the control signal corresponding to the first light mark group A1 of the first array based on the bit string of the part of the control signal corresponding to the second light mark group B1 of the first array.

Next, the detection unit 5 generates a second inspection value of the error detection code based on a reverse bit string of a part corresponding to the second light mark group B2 of the second array, of the generated light receiving signal (S107). Here, the function for generating the second inspection value of the error detection code is the same as the function used when generating the first inspection value. That is, the function for generating the second inspection value may be any function that is the same as the function used when generating the bit string of the part of the control signal corresponding to the first light mark group A1 of the first array based on the bit string of the part of the control signal corresponding to the second light mark group B1 of the first array.

Next, the detection unit 5 compares the first inspection value of the error detection code with the bit string of the light receiving signal corresponding to the first light mark group A1 of the first array and determines whether these values coincide with each other or not (S108).

FIGS. 6A to 6D are schematic views showing the light receiving state of the digital camera 4 to the light emitted from the LEDs 11a, 12a, 13a, 14a, 15a, 16a, 17a, 18a, 19a. In FIGS. 6A to 6D, a white circle shows an image of an LED emitting light, a hatched circle shows an image of an off-state LED, and a hatched semicircle shows an image of a foreign matter S. A case is considered where at the time when the light receiving state shown in FIGS. 6A to 6D is achieved, the lighting state of the LEDs 11a, 12a, 13a, 14a, 15a, 16a, 17a, 18a, 19a is off, on, on, off, on, off, off, off, on in order from the left (LED 11a). That is, the bit string of the part of the control signal corresponding to the first light mark array 1a at the time when the light receiving state shown in FIGS. 6A to 6D is achieved is "011010001".

Figure 6A:
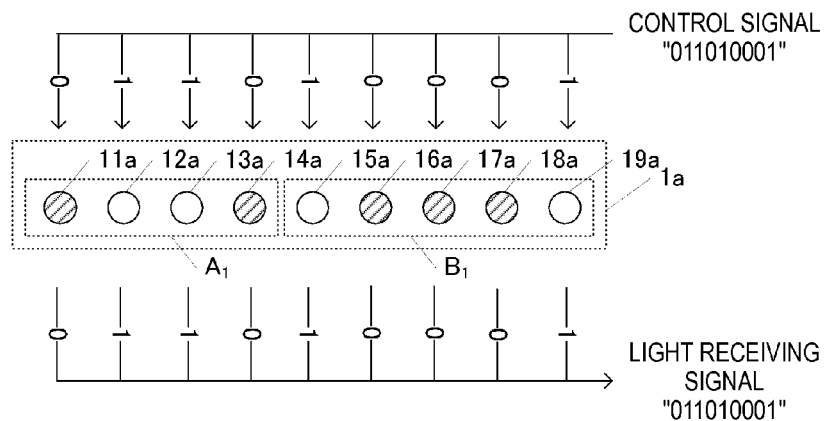
FIGS. 6A to 6D are schematic views according to an embodiment of the invention.

When there is no foreign matter in the optical paths from the LEDs 11a, 12a, 13a, 14a, 15a, 16a, 17a, 18a, 19a to the digital camera 4 at a certain time, as shown in FIG. 6A, the bit string of the part of the light receiving signal corresponding to the first light mark group A1 of the first array is "0110" and the bit string of the part of the light receiving signal corresponding to the second light mark group B1 of the first array is "10001". Thus, the bit string of the part of the control signal corresponding to the first light mark array 1a at this time is "011010001". That is, the bit string of the part of the light receiving signal corresponding to the first light mark group A1 of the first array is "0110", and the bit string "10001" of the part of the control signal corresponding to the second light mark group B1 of the first array coincides with the bit string "10001" of the part of the light receiving signal corresponding to the second light mark group B1 of the first array. Therefore, the first inspection value of the error detection code generated based on the bit string of the part of the light receiving signal corresponding to the second light mark group B1 of the first array is "0110", too. Thus, the bit string of the part of the light receiving signal corresponding to the first light mark group A1 of the first array coincides with the first inspection value of the error detection code generated based on the bit string of the part of the light receiving signal corresponding to the second light mark group B1 of the first array. In this way, when there is no foreign matter S in the optical path from any of the LEDs emitting light of the first light mark array 1a to the digital camera 4, the bit string of the part of the light receiving signal corresponding to the first light mark group A1 of the first array coincides with the first inspection value of the error detection code generated based on the bit string of the part of the light receiving signal corresponding to the second light mark group B1 of the first array.

Figure 6B:
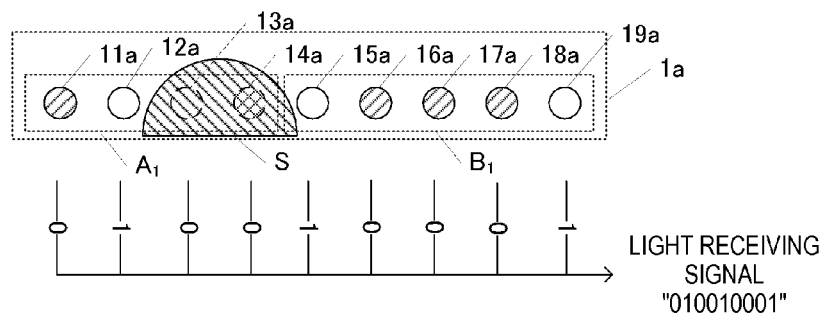

When there is a foreign matter S in the optical path from the LED 13a belonging to the first light mark group A1 of the first array and emitting light, to the digital camera 4, as shown in FIG. 6B, the bit string of the part of the light receiving signal corresponding to the first light mark group A1 of the first array is "0100". However, the bit string of the control signal corresponding to the first light mark group A1 of the first array forming the error detection code of the bit string of the part of the control signal corresponding to the second light mark group B1 of the first array is "0110". Since there is no foreign matter in the optical path from the second light mark group B1 of the first array to the digital camera 4, the bit string of the part of the control signal corresponding to the second light mark group B1 of the first array coincides with the bit string of the part of the light receiving signal corresponding to the second light mark group B1 of the first array. Therefore, it is almost certain that the first inspection value of the error detection code generated based on the bit string of the part of the light receiving signal corresponding to the second light mark group B1 of the first array and the bit string of the light receiving signal corresponding to the first light mark group A1 of the first array do not coincide with each other. In this way, when there is a foreign matter S in the optical path from one of the LEDs belonging to the first light mark group A1 of the first array and emitting light, to the digital camera 4, it is almost certain that the bit string of the part of the light receiving signal corresponding to the first light mark group A1 of the first array and the first inspection value of the error detection code generated based on the bit string of the part of the light receiving signal corresponding to the second light mark group B1 of the first array do not coincide with each other.

Figure 6C:
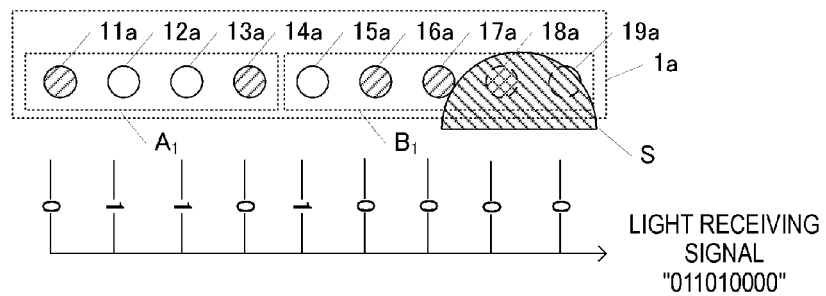

When there is a foreign matter S in the optical path from the LED 19*a* belonging to the second light mark group B1 of the first array and emitting light, to the digital camera 4, as shown in FIG. 6C, the bit string of the part of the light receiving signal corresponding to the second light mark group B1 of the first array is "10000". Since there is no foreign matter in the optical path from the first light mark group A1 of the first array to the digital camera 4, the bit string "0110" of the part of the control signal corresponding to the first light mark group A1 of the first array generated based on the bit array of the part of the control signal corresponding to the second light mark group B1 of the first array coincides with the bit string "0110" of the part of the light receiving signal corresponding to the first light mark group A1 of the first array. However, the bit string of the control signal corresponding to the second light mark group B1 of the first array is different from the bit string of the part of the light receiving signal corresponding to the second light mark group B1 of the first array. Therefore, it is almost certain that the first inspection value of the error detection code generated based on the bit string of the part of the light receiving signal corresponding to the second light mark group B1 of the first array is different from the bit string of the part of the light receiving signal corresponding to the first light mark group A1 of the first array. That is, also when there is a foreign matter S in the optical path from one of the LEDs belonging to the second light mark group B1 of the first array and emitting light, to the digital camera 4, it is almost certain that the bit string of the part of the light receiving signal corresponding to the first light mark group A1 of the first array and the first inspection value of the error detection code generated based on the bit string of the part of the light receiving signal corresponding to the second light mark group B1 of the first array do not coincide with each other.

Figure 6D:
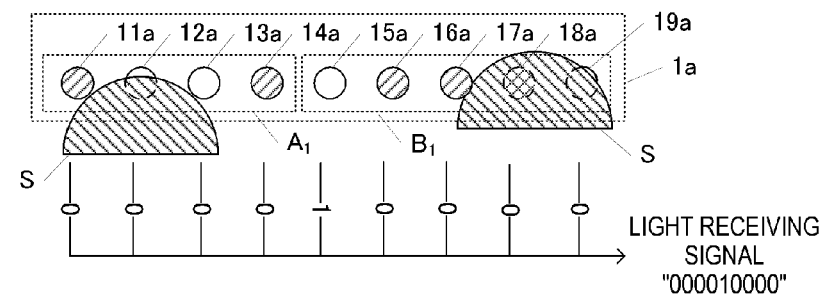

Also, when there is a foreign matter S in the optical path from one of the LEDs belonging to the first light mark group A1 of the first array and emitting light, to the digital camera 4, and there is also a foreign matter S in the optical path from one of the LEDs belonging to the second light mark group B1 of the first array and emitting light, to the digital camera 4, as shown in FIG. 6D, it is almost certain that the bit string of the part of the light receiving signal corresponding to the first light mark group A1 of the first array and the first inspection value of the error detection code generated based on the bit string of the part of the light receiving signal corresponding to the second light mark group B1 of the first array do not coincide with each other.

In this way, when the bit string of the light receiving signal corresponding to the first light mark group A1 of the first array coincides with the first inspection value of the error detection code generated based on the bit string of the part of the light receiving signal corresponding to the second light mark group B1 of the first array, it can be said that there is almost certainly no foreign matter in the optical path from the first light mark array 1*a* to the digital camera 4. Moreover, when the bit string of the light receiving signal corresponding to the first light mark group A1 of the first array does not coincide with the first inspection value of the error detection code generated based on the bit string of the part of the light receiving signal corresponding to the second light mark group B1 of the first array, it can be said that there is almost certainly a foreign matter in the optical path from the first light mark array 1*a* to the digital camera 4.

Thus, when the first inspection value of the error detection code generated based on the bit string of the part of the light receiving signal corresponding to the second light mark group B1 of the first array does not coincide with the bit string of the part of the light receiving signal corresponding to the first light mark group A1 of the first array, the detection unit 5 detects an entry from the safe work zone side where the first light mark array 1*a* is arranged, at a detection target time (S109). Here, the detection target time is the time when images of the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* are recorded in the image data equivalent to one frame acquired by the detection unit 5 from the digital camera 4.

Meanwhile, when the first inspection value of the error detection code generated based on the bit string of the part of the light receiving signal corresponding to the second light mark group B1 of the first array coincides with the bit string of the part of the light receiving signal corresponding to the first light mark group A1 of the first array, the detection unit 5 determines that there is no entry from the safe work zone side where the first light mark array 1*a* is arranged, at the detection target time, and then executes the following processing of step S110. If an entry from the safe work zone side where the first light mark array 1*a* is arranged is detected in step S109, the following processing of step S110 may be executed or the entry detection processing may be ended without executing the processing of step S110.

In step S110, the detection unit 5 compares the second inspection value of the error detection code with the reverse bit string of the part of the light receiving signal corresponding to the first light mark group A2 of the second array and determines whether these values coincide with each other or not (S110).

Figure 7:
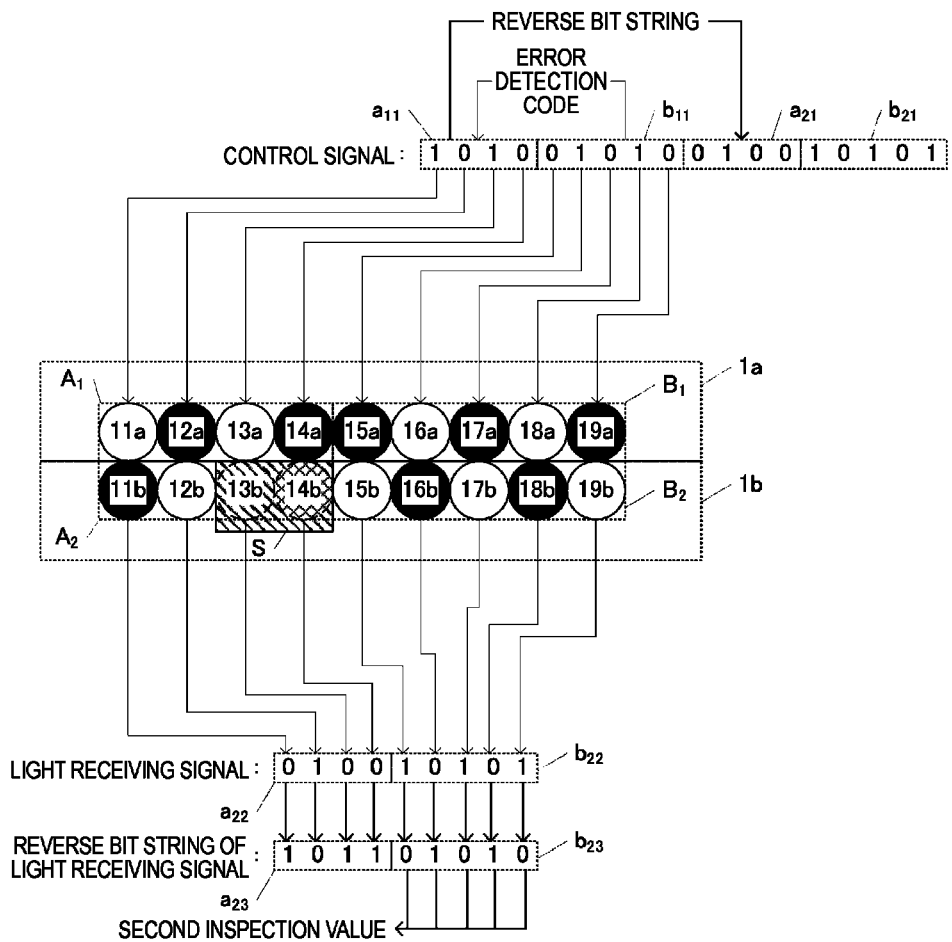
FIG. 7 is a schematic view according to an embodiment of the invention.

FIG. 7 is a schematic view showing the light receiving state of the digital camera 4 to the light emitted from the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b*. In FIG. 7, a white circle shows an image of an LED emitting light, a hatched circle shows an image of an off-state LED, and a hatched semicircle shows an image of a foreign matter S. A case is considered where at the time when the light receiving state shown in FIG. 7 is achieved, the lighting state of the first light mark array 1*a* is on, off, on, off, off, on, off, on, off in order from the left (LED 11*a*). Thus, at the same time, the lighting state of the second light mark array 1b is off, on, off, on, on, off, on, off, on in order from the left (LED 11b). That is, the control signal corresponding to the time when the light receiving state shown in FIG. 7 is achieved is "101001010010010101".

In this case, since there is no foreign matter in the optical path from the second light mark group B2 of the second array to the digital camera 4, a bit string b22 of a part of the light receiving signal corresponding to the second light mark group B2 of the second array coincides with a bit string b21 of a part of the control signal corresponding to the second light mark group B2 of the second array. Therefore, a reverse bit string b23 of a part of the light receiving signal corresponding to the second light mark group B2 of the second array coincides with a bit string b11 of a part of the control signal corresponding to the second light mark group B1 of the first array. Therefore, as a second inspection value is generated from the reverse bit string b23 of the part of the light receiving signal corresponding to the second light mark group B2 of the second array, the second inspection value coincides with a bit string all of a part of the control signal corresponding to the first light mark group A1 of the first array. Meanwhile, there is a foreign matter S in the optical path from the first light mark group A2 of the second array to the digital camera 4. Therefore, a bit string a21 of a part of the control signal corresponding to the first light mark group A2 of the second array, which is a reverse bit string of the bit string all of the part of the control signal corresponding to the first light mark group A1 of the first array, does not coincide with a reverse bit string a23 of the part of the light receiving signal corresponding to the first light mark group A2 of the second array. Thus, when there is a foreign matter S in the optical path from the first light mark group A2 of the second array to the digital camera 4, it is almost certain that the second inspection value generated from the reverse bit string b23 of the part of the light receiving signal corresponding to the second light mark group B2 of the second array and the reverse bit string a23 of the part of the light receiving signal corresponding to the first light mark group A2 of the second array do not coincide with each other.

Similarly, when there is a foreign matter in the optical path from the second light mark group B2 of the second array to the digital camera 4, it is almost certain that the second inspection value generated from the reverse bit string b23 of the part of the light receiving signal corresponding to the second light mark group B2 of the second array and the reverse bit string a23 of the part of the light receiving signal corresponding to the first light mark group A2 of the second array do not coincide with each other.

Meanwhile, when there is no foreign matter in the optical path from the first light mark group A2 of the second array to the digital camera 4 or in the optical path from the second light mark group B2 of the second array to the digital camera 4, the second inspection value generated from the reverse bit string b23 of the part of the light receiving signal corresponding to the second light mark group B2 of the second array and the reverse bit string a23 of the part of the light receiving signal corresponding to the first light mark group A2 of the second array coincide with each other.

Therefore, when the second inspection value generated from the reverse bit string b23 of the part of the light receiving signal corresponding to the second light mark group B2 of the second array and the reverse bit string a23 of the part of the light receiving signal corresponding to the first light mark group A2 of the second array coincide with each other, it can be said that there is almost certainly no foreign matter in the optical path from the second light mark array 1b to the digital camera 4. Conversely, when the second inspection value generated from the reverse bit string b23 of the part of the light receiving signal corresponding to the second light mark group B2 of the second array and the reverse bit string a23 of the part of the light receiving signal corresponding to the first light mark group A2 of the second array do not coincide with each other, it can be said that there is almost certainly a foreign matter in the optical path from the second light mark array 1b to the digital camera 4.

Thus, when the second inspection value generated from the reverse bit string b23 of the part of the light receiving signal corresponding to the second light mark group B2 of the second array and the reverse bit string a23 of the part of the light receiving signal corresponding to the first light mark group A2 of the second array do not coincide with each other, the detection unit 5 detects an entry from the danger zone side where the second light mark array 1b is arranged at the detection target time (S111).

Meanwhile, when the second inspection value generated from the reverse bit string b23 of the part of the light receiving signal corresponding to the second light mark group B2 of the second array and the reverse bit string a23 of the part of the light receiving signal corresponding to the first light mark group A2 of the second array coincide with each other, it is considered that there is no entry from the danger zone side where the second light mark array 1b is arranged at the detection target time, and the entry detection processing ends.

As described above, the detection unit 5 outputs a signal indicating whether there is an entry from the safe work zone side or not and whether there is an entry from the danger zone side or not, to the robot controller 61 of the robot body 6. When the detection unit 5 detects an entry form the safe work zone side, the robot controller 61 starts predetermined processing such as stopping the actuator, outputting a warning sound, or turning on a warning lamp. Also, when the detection unit 5 detects an entry from the danger zone side, that is, from the side of the robot body 6, the robot controller 61 starts predetermined processing such as outputting a sound to instruct the workers 9a, 9b to take out a workpiece and tuning on an indicator indicating to the workers 9a, 9b that the workpiece can be taken out.

According to this example, based on image data equivalent to one frame acquired from the digital camera 4, the detection unit 5 can detect an entry at the time when an image of the light emitting unit 1 is recorded in the image data. Therefore, the entry detection device 7 can detect an entry into the danger zone with a minimum delay. Moreover, according to this example, when one LED of the LED pairs 11 to 19 arranged near each other on both sides of the boundary is on, the other LED is necessarily off. Therefore, an entry across the boundary can securely be detected. Also, since the detection unit 5 can detect an entry using a light receiving signal generated from the image data acquired from the digital camera 4 and a predetermined function of error detection code, the light on-off control unit 2 and the detection unit 5 need not be connected via a signal line. When the light on-off control unit 2 and the light emitting unit 1 are considered to be an integral unit while the digital camera 4 and the detection unit 5 are considered to be another integrated unit, and these two units are installed at both ends of the boundary over which an entry is detected, the entry detection device 7 can easily be installed if the two units need not be connected via a signal line even if the distance from the light on-off control unit 2 to the detection unit 5 extends to several meters. Also, since the detection unit 5 separately detects an entry in the optical path from the first light mark array 1a to the digital camera 4 and an entry in the optical path from the second light mark array 1b to the digital camera 4, whether an entry is made from the danger zone side or from the safe work zone side is specified. Thus, according to this example, when the detection unit 5 detects an entry, the content of processing started by the robot controller 61 can be varied depending on whether an entry is made from the danger zone side or from the safe work zone side.

2. Second Example

In the above first example, the light emission pattern of the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* is controlled by a control signal generated by the light on-off control unit 2. When there is no foreign matter in the optical path from the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* to the digital camera 4, a light receiving signal is generated by the detection unit 5 in accordance with the light emission pattern of the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b*. That is, in the above first example, when there is no foreign matter in the optical path from the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* to the digital camera 4, a control signal is transmitted as a light receiving signal from the light on-off control unit 2 to the detection unit 5 in accordance with the light emitted from the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b*. Thus, the light on-off control unit 2 may generate a control signal so that time information and identification information of the individual LEDs can be obtained from a light receiving signal generated by the detection unit 5.

The light emission pattern of the first light mark array 1*a* and the light emission pattern of second light mark array 1*b* are the reverse of each other in terms of on and off. Since the part of the control signal corresponding to the first light mark group A1 of the first light mark array 1*a* is the error detection code of the part of the control signal corresponding to the second light mark group B1 of the first light mark array 1*a*, the control signal of the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* is redundant as a signal indicating information. That is, the parts of the control signal corresponding to the first light mark group A1 of the first light mark array 1*a* and the first light mark group A2 of the second light mark array 1*b* cannot represent significant information, and information equivalent to only 5 bits, that is, a half of the 10 bits allocated in total to the part of the control signal corresponding to the second light mark group B1 of the first light mark array 1*a* and the part of the control signal corresponding to the second light mark group B2 of the second light mark array 1*b*, can be transmitted from the light on-off control unit 2 to the detection unit 5.

Specifically, for example, a time-series bit string of the control signal corresponding to the LED 15*a* may be generated so that a time-series light receiving signal corresponding to the LED 15*a* forms identification information that can identify the LED 15*a* with respect to the other LEDs. The time-series bit string of the control signal corresponding to the LED 15*a* at the times t1 to t8 shown in FIG. 2 is "01001010". The time-series bit string of the control signal corresponding to the LED 16*a* at the times t1 to t8 shown in FIG. 2 is "10011001".

Thus, information that "01001010" indicates the LED 15*a* and "10011001" indicates the LED 16*a*, is stored in advance in the detection unit 5. Thus, when a time-series signal of on (1) and off (0) obtained by the detection unit 5 from the luminance value of an arbitrary local area of image data acquired from the digital camera 4 is "01001010", it can be specified that the local area corresponds to the LED 15*a*. Also, when a time-series signal of on (1) and off (0) obtained from the luminance value of an arbitrary local area of image data is "10011001", it can be specified that the local area corresponds to the LED 16*a*. By thus including identification information of the LED in the control signal of the individual LEDs, the correspondence between local areas of image data acquired from the digital camera 4 and the individual LEDs can be specified at the detection unit 5. When the correspondence between local areas of image data acquired from the digital camera 4 and the individual LEDs can be specified at the detection unit 5, local areas where the luminance value is acquired in order to detect the lighting state of the individual LEDs can be set according to the positional relation between the digital camera 4 and the light emitting unit 1. Consequently, the positional relation between the digital camera 4 and the light emitting unit 1 can be set freely to a certain extent.

Moreover, for example, time information that can specify a specific time when all the LEDs 11*a*, 12*a*, 13*a*, 14*a*, 15*a*, 16*a*, 17*a*, 18*a*, 19*a*, 11*b*, 12*b*, 13*b*, 14*b*, 15*b*, 16*b*, 17*b*, 18*b*, 19*b* emit light, based on the light emitted at that time, can be transmitted from the light on-off control unit 2 to the detection unit 5. For example, the bit string of the part of the control signal corresponding to the LEDs 15*a*, 16*a*, 17*a*, 18*a*, 19*a* at the time t9 in FIG. 2 is "01010". By storing a encoding rule for encoding time to a control signal in the light on-off control unit 2 and storing a decoding rule for decoding a light receiving signal to time in the detection unit 5 in advance, the correspondence between an arbitrary frame of image data acquired from the digital camera 4 and time can be specified at the detection unit 5. Thus, the detection unit 5 can detect whether there is an entry or not, adding attribute information that indicates time.

Since the bit string of the part of the control signal corresponding to the first light mark group A1 of the first array is the function (error detection code) of the bit string of the part of the control signal corresponding to the second light mark group B1 of the first array, the identification information of the LED and the time information cannot be included in the bit string of the part of the control signal corresponding to the first light mark group A1 of the first array. That is, the identification information of each LED and the time information belonging to the second light mark group B1 of the first array may be encoded to generate a bit string of the part of the control signal corresponding to the second light mark group B1 of the first array, and an error detection code of the generated bit string of the part of the control signal corresponding to the second light mark group B1 of the first array may be generated as the bit string of the part of the control signal corresponding to the first light mark group A1 of the first array.

Figure 8:
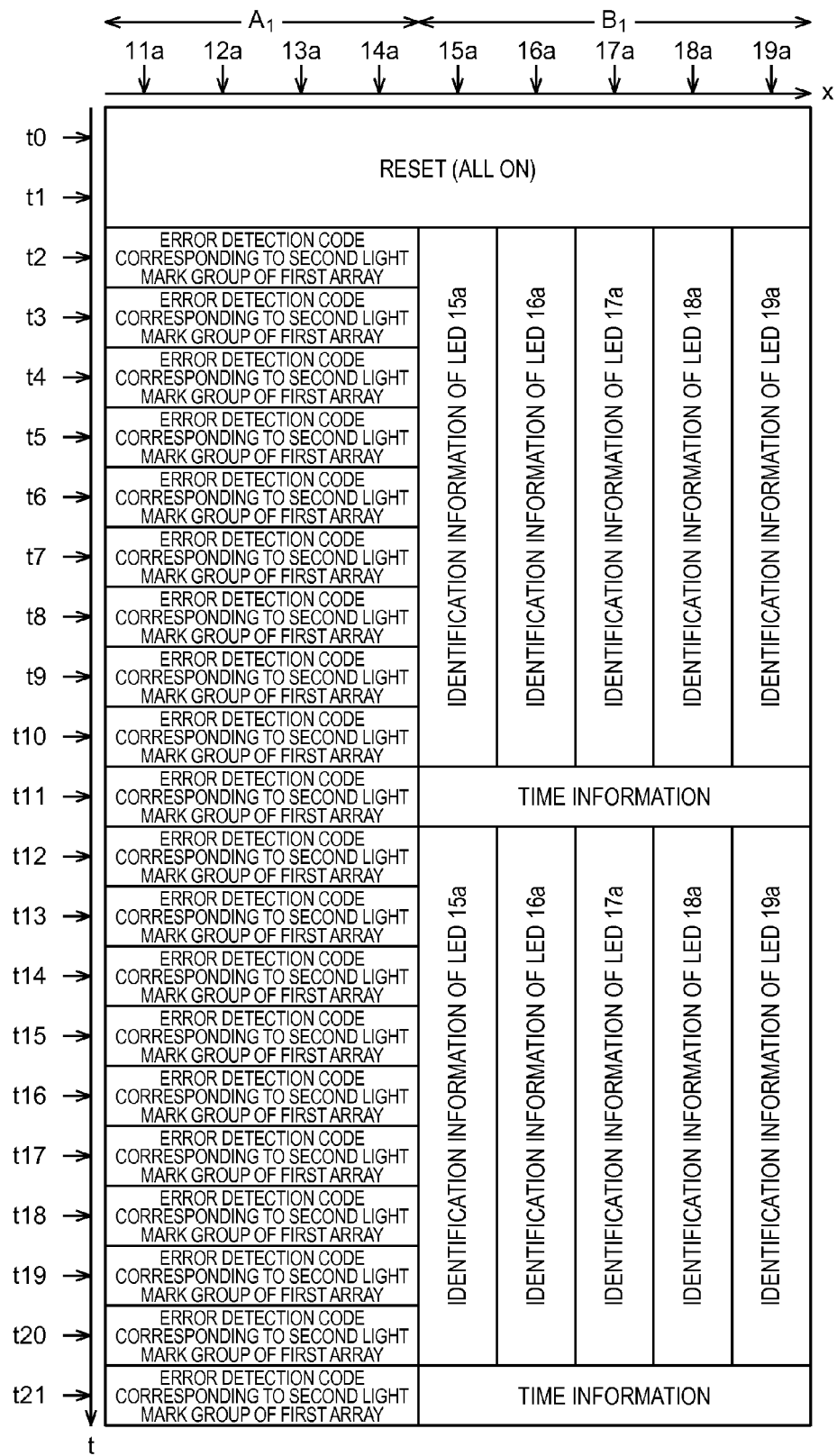
FIG. 8 is a schematic view according to an embodiment of the invention.

Thus, the light on-off control unit 2 sets the cycle of the control signal of all the LEDs to 9 units of time, inserts the time information at the same time, also inserts the identification information of the individual LEDs belonging to the second light mark group B1 of the first array in time series, and generates the bit string of the part of the control signal corresponding to the second light mark group B1 of the first array in each cycle, for example, as shown in FIG. 8. Then, the light on-off control unit 2 generates the bit string of the part of the control signal corresponding to the first light mark group A1 of the first array, based on the bit string of the part of the control signal corresponding to the second light mark group B1 of the first array. In this case, the light emission pattern at a specific time having the time information can also have the function of a synchronizing signal that can specify the start point of the time-series light emission pattern having the identification information. Of course, a reset signal or synchronizing signal to set up a special light emission pattern such as turning on all the LEDs can also be inserted.

3. Third Example

Figure 9:
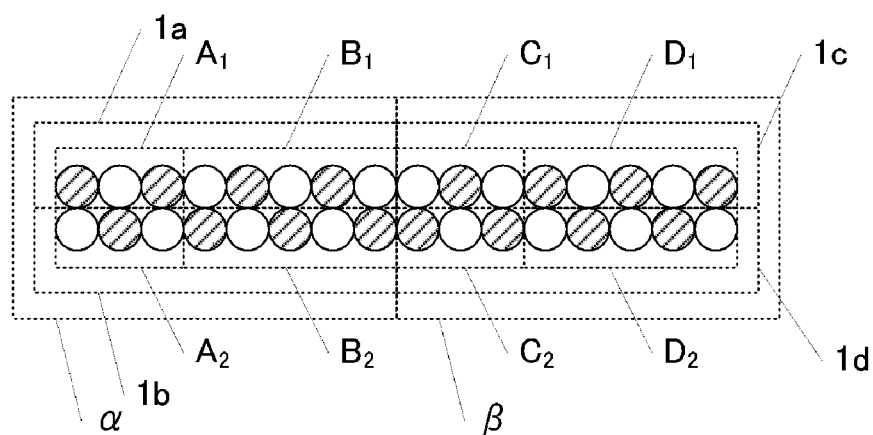
FIG. 9 is a schematic view according to an embodiment of the invention.

FIG. 9 is a schematic view showing a third example of the invention. Circles shown in FIG. 9 show the LEDs of the light emitting unit 1. A white circle indicates on-state. A hatched circle indicates off-state.

In this example, the LEDs provided in the light emitting unit 1 are divided into blocks as control targets. That is, the plural LEDs provided in the light emitting unit 1 are divided into a first light mark block α made up of LEDs forming a first light mark array 1a including a first light mark group A1 and a second light mark group B1 and a second light mark array 1b including a first light mark group A2 and a second light mark group B2, and a second light mark block β made up of LEDs forming a first light mark array 1c including a first light mark group C1 and a second light mark group D1 and a second light mark array 1d including a first light mark group C2 and a second light mark group D2, as control targets of the light on-off control unit 2. That is, in the bit string of the part of the control signal corresponding to the first light mark block α, the bit string of the part corresponding to the first light mark group A1 forms an error detection code of the bit string of the part corresponding to the second light mark group B1, and the bit string of the part corresponding to the first light mark array 1a forms the reverse bit string of the second light mark array 1b. Also, in the bit string of the part of the control signal corresponding to the second light mark block β, the bit string of the part corresponding to the first light mark group C1 forms an error detection code of the bit string of the part corresponding to the second light mark group D1, and the bit string of the part corresponding to the first light mark array 1c forms the reverse bit string of the second light mark array 1d.

Also, the detection unit 5 generates, for each light mark block, a first inspection value of the error detection code from the bit string of the part of the light receiving signal corresponding to the second light mark group of the first array and compares the first inspection value with the bit string of the part of the light receiving signal corresponding to the first light mark group of the first array. The detection unit 5 also generates a second inspection value of the error detection code from the reverse bit string of the part of the light receiving signal corresponding to the second light mark group of the second array and compares the second inspection value with the reverse bit string of the part of the light receiving signal corresponding to the first light mark group of the second array. For example, when the first inspection value of the error detection code generated from the bit string of the part of the light receiving signal corresponding to the second light mark group B1 of the first array does not coincide with the bit string of the part of the light receiving signal corresponding to the first light mark group A1 of the first array, the detection unit 5 detects that there is an entry from the safe work zone side in the optical path from the first light mark block α to the digital camera 4. Also, when the second inspection value of the error detection code generated from the reverse bit string of the part of the light receiving signal corresponding to the second light mark group D1 does not coincide with the reverse bit string of the part of the light receiving signal corresponding to the first light mark group C2, the detection unit 5 detects that there is an entry from the danger zone side in the optical path from the second light mark block β to the digital camera 4.

In this way, the entry detection device 7 according to this example can detect an entry in each section corresponding to a light mark block and therefore can specify at which position on the boundary and from which side the entry is made. Moreover, since the entry detection device 7 can detect an entry in each section corresponding to a light mark block, the entry detection device 7 is capable of detecting an entry only in a specific section of the boundary and not detecting an entry in another section of the boundary. For example, if an entry in the optical path from the first light mark block α to the digital camera 4 is to be detected but an entry in the optical path from the second light mark block β to the digital camera 4 is not to be detected, a signal showing the detection result of the second light mark block β may be fixed constantly to a value indicating that there is no entry, irrespective of the actual detection result.

If a temporary undetectable zone can be set on the boundary where an entry can be detected by the entry detection device 7, the workers 9a, 9b can put a workpiece into and take a workpiece out of the robot body 6, for example, while the robot body 6 is operating. Thus, an environment where an industrial robot and a person work in cooperation can be designed flexibly.

4. Other Embodiments

Some embodiments of the invention are described, based on examples. However, the technical field of the invention is not limited to the above examples and various changes can be made in the above examples to carry out the invention.

For example, the light receiving surface of the digital camera 4 and the light emitting surface of the light emitting unit 1 may be made to face each other in vertical direction, as shown in FIGS. 10A and 10B. Also, the light receiving surface of the digital camera 4 and the light emitting surface of the light emitting unit 1 may be made to face each other in horizontal direction, as shown in FIG. 10C. Moreover, for example, when the boundary of the danger zone of the robot body 6 is curved as shown in FIG. 10D, light marks such as LEDs may be arranged along the curve, in the light emitting surface of the light emitting unit 1.

As a light mark, a light source such as fluorescent tube, light bulb and laser may be used as well as LED. A liquid crystal shutter which intercepts and opens the optical path from a light source to a light sensor may also be used as a light mark.

Moreover, as a light sensor used to detect the light receiving state of the light mark, a light sensor having spatial resolution such as area image sensor or linear image sensor may be used, or a light sensor without having spatial resolution such as photodiode may be used. Even when a light sensor without having spatial resolution such as photodiode is used, an entry can be detected on a broad boundary surface to a certain extent by pairing a light mark with directivity such as laser with a light sensor and using plural such pairs.

What is claimed is:
1. A robot comprising:
   an arm;
   an actuator;
   a plurality of first light marks that are arrayed in a first area on one side demarcated by a boundary, the plurality of first light marks being along the boundary, each of the plurality of first light marks emitting a light;
   a plurality of second light marks that are arrayed in a second area on the other side demarcated by the boundary, each of the plurality of second light marks being in a one-to-one pair relationship with the each of the plu- rality of first light marks, the each of the plurality of second light marks emitting a light; and a light sensor that receives the light from the each of the plurality of first light marks and the each of the plurality of second light marks and that outputs a light sensor signal corresponding to the received light, wherein a first time for emitting the light by the each of the plurality of first light marks is different from a second time for emitting the light by the each of the plurality of second light marks, and the arm and the actuator move based on the light sensor signal.

* * * * *